(12) United States Patent
Wallace et al.

(10) Patent No.: US 6,237,877 B1
(45) Date of Patent: May 29, 2001

(54) FAILED BEARING INDICATOR

(76) Inventors: James L. Wallace, 14915 Hollydale Dr., Houston, TX (US) 77062; Ronney L. Broussard, P.O. Box 490, Pollock, LA (US) 71467

( * ) Notice: Subject to any disclaimer, the term of this patent is extended or adjusted under 35 U.S.C. 154(b) by 0 days.

(21) Appl. No.: 09/500,344

(22) Filed: Feb. 7, 2000

(51) Int. Cl.$^7$ .................................................. B61K 9/04
(52) U.S. Cl. .............................. 246/169 A; 246/169 R; 246/DIG. 2; 246/201; 246/171; 105/182.1; 105/217; 105/218.1
(58) Field of Search ........................... 246/169 A, 169 R, 246/DIG. 2, 201, 171; 105/157.1, 182.1, 217, 218.1, 219, 220, 221.1

(56) References Cited

U.S. PATENT DOCUMENTS

| | | | | |
|---|---|---|---|---|
| 308,830 | * | 12/1884 | Conway | 105/217 |
| 961,098 | * | 6/1910 | Bradshaw | 105/182.1 |
| 985,650 | * | 2/1911 | Andrew | 105/182.1 |
| 2,721,934 | * | 10/1955 | Shepardson | 246/169 A |
| 2,771,039 | * | 11/1956 | Dean | 105/217 |
| 3,790,777 | * | 2/1974 | Pelino | 246/169 A |
| 3,998,549 | | 12/1976 | Fuscia | 356/48 |
| 4,068,811 | | 1/1978 | Caulier | 246/169 A |
| 4,119,284 | * | 10/1978 | Belmont | 246/169 A |
| 4,316,175 | | 2/1982 | Korber | 246/169 A |
| 4,323,211 | * | 4/1982 | Bambara et al. | 246/169 A |
| 4,356,790 | | 11/1982 | Gee | 116/216 |
| 4,501,006 | | 2/1985 | Korenberg | 377/45 |
| 4,659,043 | | 4/1987 | Gallagher | 246/169 A |
| 4,674,412 | * | 6/1987 | Mulcahy et al. | 105/224.1 |
| 4,812,826 | | 3/1989 | Kaufman | 340/682 |
| 4,818,119 | * | 4/1989 | Busch et al. | 374/208 |
| 4,878,761 | | 11/1989 | Duhrkoop | 374/124 |
| 5,100,243 | | 3/1992 | Grosskopf | 374/2 |
| 5,149,025 | | 9/1992 | Utterback | 246/169 A |
| 5,203,278 | * | 4/1993 | Kinney | 116/218 |
| 5,446,452 | * | 8/1995 | Litton | 340/870.17 |
| 5,509,359 | * | 4/1996 | Houston | 105/225 |

* cited by examiner

*Primary Examiner*—S. Joseph Morano
*Assistant Examiner*—Frantz F. Jules
(74) *Attorney, Agent, or Firm*—John M. Harrison

(57) ABSTRACT

A failed bearing indicator for detecting and indicating an overheated axle journal in a railcar axle bearing. In a preferred embodiment the failed bearing indicator is characterized by an elongated connector chain terminated on each end by a T-shaped connector bracket. Each of the connector brackets is typically bolted to a common pedestal adaptor which is mounted on each corresponding axle bearing of the railcar, and one of the fastening bolts is constructed of a heat-resistant material and the other fastening bolt is constructed of a heat-sensitive material. In the event that the axle bearing overheats during travel of the railcar on the railroad, the heat-sensitive bolt melts and releases the corresponding connector bracket from the pedestal adaptor, while the other connector bracket, secured by the heat-resistant bolt, remains attached to the pedestal adaptor. The released connector bracket, suspended from the connector chain, strikes and activates a typically conventional dragging equipment sensor adjacent to the railroad, to alert railroad personnel to the overheated bearing before complete failure of the bearing. In another embodiment a rectangular offset bend connector plate is provided on each end of the connector chain in place of the connector brackets, to facilitate attachment of the connector chain to the pedestal adaptor. In still another embodiment, the connector brackets or offset bend connector plates are provided on opposite ends of an elongated, flexible connector cable instead of the connector chain.

20 Claims, 4 Drawing Sheets

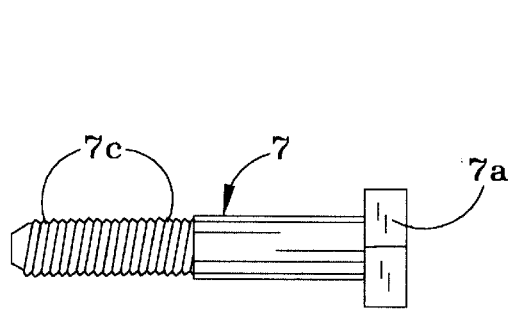
FIG. 3
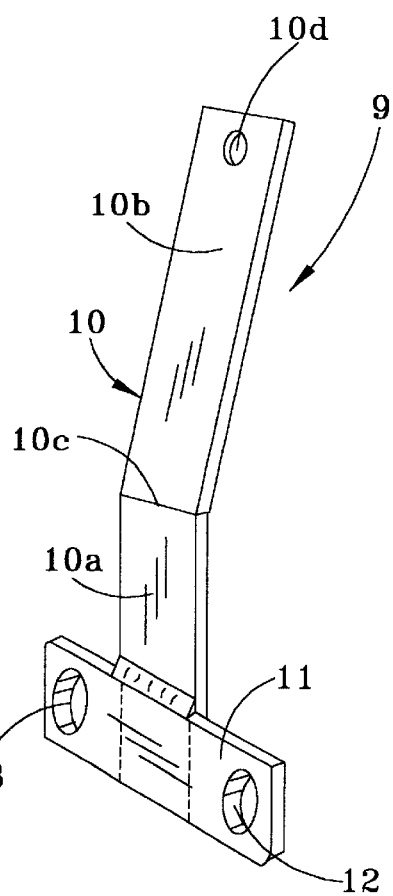
FIG. 4
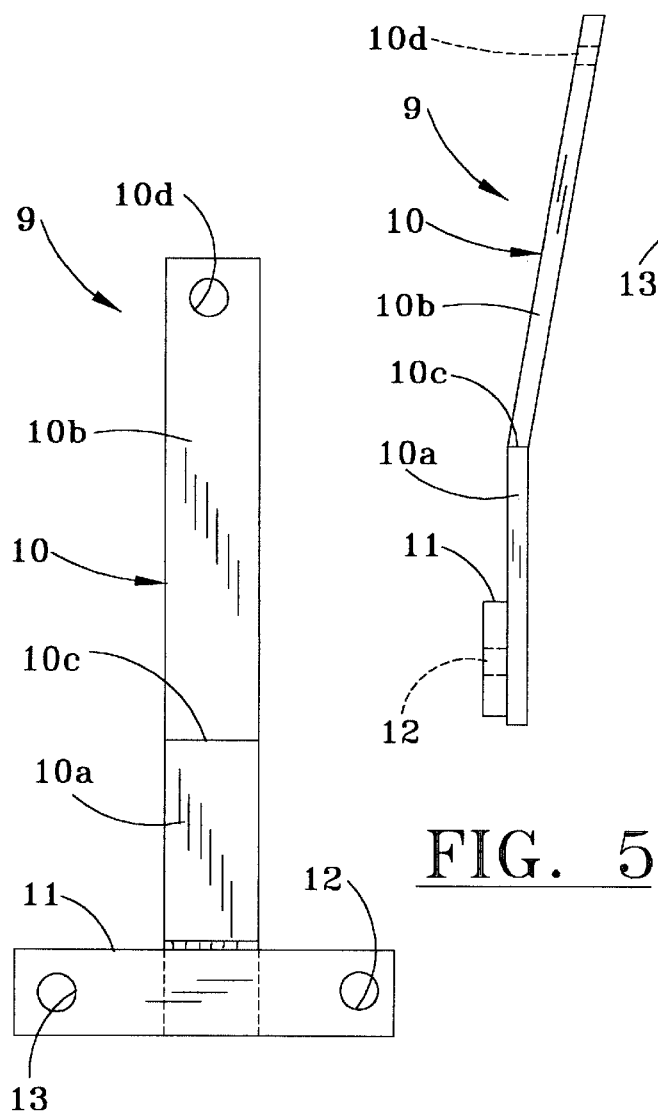
FIG. 5
FIG. 6

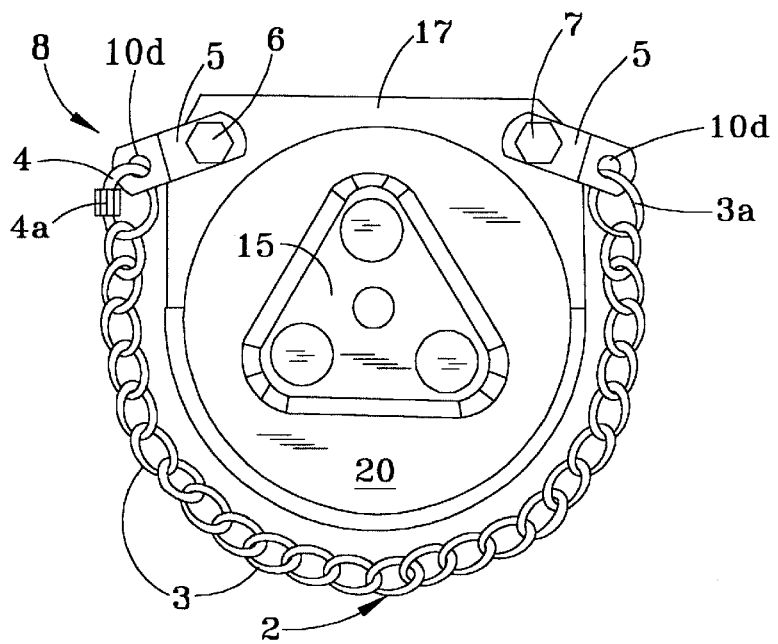
FIG. 9
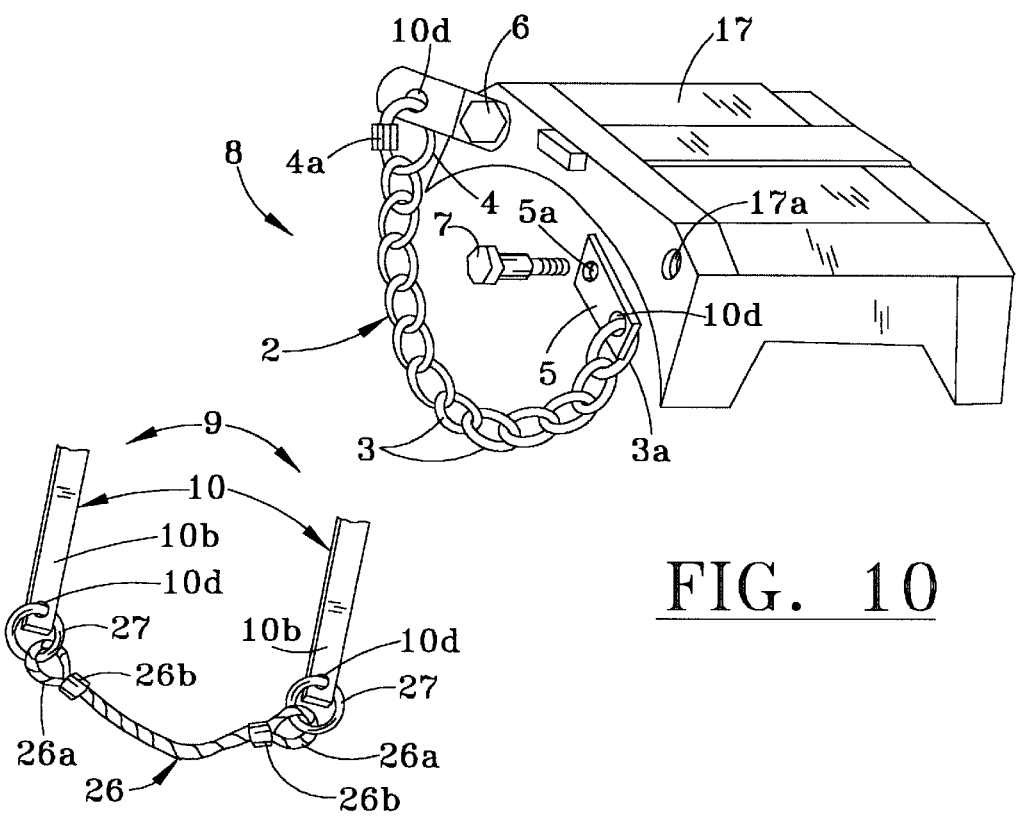
FIG. 10
FIG. 11

FAILED BEARING INDICATOR

BACKGROUND OF THE INVENTION

1. Field of the Invention

This invention relates to heat-sensitive warning devices for railcar axles and more particularly, to a failed bearing indicator for indicating an overheated axle journal in a railcar axle bearing, wherein the failed bearing indicator drops from a secured to a suspended configuration from the traveling railcar in the event of overheating of the bearing, and the suspended bearing indicator strikes and activates a typically conventional dragging equipment sensor on the side of a railroad to alert railroad personnel to the overheated railcar bearing before complete failure of the bearing. In a preferred embodiment the failed bearing indicator is characterized by an elongated connector chain terminated on one end by a T-shaped connector bracket which is fastened typically by means of a heat-resistant attachment bolt to a drilled and tapped pedestal adaptor, a conventional railcar component which is typically mounted on a corresponding axle bearing of the railcar. The other end of the connector chain is terminated by a second connector bracket which is fastened to the pedestal adaptor, typically by means of a heat-sensitive release bolt. In the event of overheating of the axle bearing during travel of the railcar on the railroad, the heat-sensitive release bolt melts and releases the corresponding connector bracket from the pedestal adaptor, while the other connector bracket remains attached to the pedestal adaptor by means of the heat-resistant attachment bolt. The released connector bracket swings down from the pedestal adaptor on the connector chain and, while suspended from the connector bracket, strikes and activates the dragging equipment sensor adjacent to the railroad, to alert railroad personnel to the overheated bearing before complete failure of the bearing. The connector chain, the offset bend connector plate or connector brackets, or all three, typically has a bright, light-reflective color for enhanced visibility of the heat-activated bearing indicator in the failed position and identification of the overheated bearing. In another embodiment a rectangular offset bend connector plate is provided on each end of the connector chain in place of the connector brackets, to facilitate typically bolted attachment of the connector chain to the drilled and tapped pedestal adaptor. In still another embodiment, the connector brackets or offset bend connector plates are provided on opposite ends of an elongated, flexible connector cable instead of the connector chain.

Failed railcar bearings, which are typically caused by friction-induced heating of the rotating railcar axle journal in the stationary bearing and breakage of the axle from the bearing, frequently cause derailment of the railcar or railcars and attendant property damage, with possible injuries and deaths. In the past, railcar axle journals were fitted with oiling pads and brass bearings which have since been replaced by the modern roller bearing axle journal. While the oiling pads and brass bearings of the old axle journals squealed, smoked and finally flamed in the event of axle overheating, thus providing several warnings of an overheated axle journal before the axle broke loose from the bearing, overheating of the newer bearings is much more difficult to detect. Since the advent of the modern roller bearing journal, the railroad industry has been plagued with failed journals due to friction-induced wearing of the axle journals in the bearings, resulting in considerable property damage. The heat sensors sometimes fail to detect heat buildup from the roller bearings before they begin to fail. Furthermore, when the heat sensors do successfully detect excessive heat buildup of the bearings and properly alert railroad authorities, the sensors have not always accurately indicated which bearing or bearings of the railcar or railcars of the train are in danger of failing. After the overheated bearing or bearings have been identified by the detector, the failed bearing or bearings are typically located by counting axles rearwardly from the engine, a time and labor-intensive procedure. A limitation of the heat sensors becomes apparent under circumstances in which the sensors fail to detect an overheated journal and avoid a costly derailment or damage to the railroad. An additional detector located at the heat sensor site is designed to detect objects dragging from a moving railcar. These dragging equipment detectors are incapable of detecting overheated bearings.

2. Description of the Prior Art

A variety of devices for detecting and indicating overheated railcar bearings are known in the art. Several of these devices are detailed in U.S. Pat. Nos. 3,998,549; 4,068,811; 4,119,284; 4,316,175; 4,323,211; 4,501,006; 4,659,043; 4,812,826; 4,878,761; 4,928,910; 5,149,025; 5,100,243; 5,203,278; and 5,446,452.

An object of this invention is to provide a new and improved, heat-activated failed bearing indicator for detecting and indicating an overheated railcar axle journal in an axle bearing.

Another object of this invention is to provide a failed bearing indicator for detecting and indicating an overheated axle journal in a railcar axle bearing by heat-activated suspension of the indicator from the traveling railcar in the event of overheating of the bearing, wherein the suspended indicator strikes and activates a typically conventional dragging equipment sensor on the side of a railroad to alert railroad personnel to the overheated bearing before complete failure of the bearing.

Still another object of this invention is to provide a failed bearing indicator for detecting and indicating an overheated axle journal in a railcar axle bearing, which failed bearing indicator is reliable and yet simple in construction and installation.

Yet another object of this invention is to provide a failed bearing indicator for detecting and indicating an overheated axle journal in a railcar bearing, which failed bearing indicator is characterized by an elongated, flexible connector chain, typically having a bright or light-reflective color; a connector bracket provided on each end of the connector chain, which connector brackets may also have a bright or light-reflective color; a heat-resistant fastener engaging one of the connector brackets for fastening the connector bracket to a pedestal adaptor, a conventional railcar component mounted on each corresponding axle bearing of the railcar; and a heat-sensitive fastener engaging the other connector bracket for fastening the connector bracket to the pedestal adaptor. In the event that the axle bearing overheats due to friction-induced heating of the rotating axle journal in the stationary bearing during travel of the railcar on the railroad, the heat-sensitive bolt melts and releases the corresponding connector bracket from the pedestal adaptor, while the other connector bracket remains attached to the pedestal adaptor by means of the heat-resistant bolt. The released connector bracket, suspended from the connector chain, strikes and activates a typically conventional dragging equipment sensor adjacent to the railroad, to alert railroad personnel to the overheated bearing. The bright or light-reflective color of the connector chains, connector brackets or both facilitates quick identification of the failing bearing or bearings on the railcar or railcars.

A still further object of this invention is to provide a failed bearing indicator for detecting and indicating an overheated axle journal in a railcar bearing, which failed bearing indicator is characterized by an elongated, flexible connector chain; an offset bend connector plate provided on each end of the connector chain; a heat-resistant fastener engaging one of the offset bend connector plates for connecting the offset bend connector plate to a pedestal adaptor which is a conventional railcar component mounted on each corresponding axle bearing of the railcar; and a heat-sensitive fastener engaging the other offset bend connector plate for connecting the offset bend connector plate to the pedestal adaptor, wherein friction-induced overheating of the railcar bearing causes the heat-sensitive fastener to melt and release the corresponding offset bend connector plate from the railcar while the other offset bend connector plate remains attached to the traveling railcar, and the released offset bend connector plate, suspended from the moving railcar, strikes and activates a typically conventional dragging equipment sensor on the side of the railroad to alert railroad personnel to the overheated bearing before complete failure of the bearing.

Another object of this invention is to provide a failed bearing indicator for detecting and indicating an overheated axle journal in a railcar bearing, which failed bearing indicator is characterized by an elongated, flexible connector cable; a connector bracket or plate provided on each end of the connector cable; a heat-resistant fastener engaging one of the connector brackets or plates for fastening the connector bracket or plate to a pedestal adaptor, a conventional railcar component which is mounted on each corresponding axle bearing of the railcar; and a heat-sensitive fastener engaging the other connector bracket or plate for fastening the connector bracket or plate to the pedestal adaptor.

A still further object of the invention is to provide a failed bearing indicator which indicates a previously overheated bearing, which bearing indicator can be observed by any railroad personnel.

SUMMARY OF THE INVENTION

These and other objects of the invention are provided in a failed bearing indicator for detecting and indicating an overheated axle journal in a railcar axle bearing, by heat-induced suspension of the indicator from the railcar wherein the suspended indicator strikes and activates a typically conventional dragging equipment sensor on the side of a railroad to alert railroad personnel in the event of overheating and potential failure of the bearing. In a preferred embodiment the failed bearing indicator is characterized by an elongated connector chain terminated on one end by a T-shaped connector bracket which is fastened typically by means of a heat-resistant attachment bolt to a drilled and tapped opening in a pedestal adaptor, a conventional railcar component mounted on a corresponding axle bearing of the railcar. The other end of the connector chain is terminated by a second connector bracket which is fastened to the pedestal adaptor, typically by means of a heat-sensitive release bolt, in a second drilled and tapped hole. In the event of overheating of the axle bearing during travel of the railcar on the railroad, the heat-sensitive release bolt melts and releases the corresponding connector bracket from the pedestal adaptor, while the other connector bracket remains attached to the pedestal adaptor by means of the heat-resistant attachment bolt. The released connector bracket swings down from the pedestal adaptor on the connector chain and, while suspended from the connector bracket, strikes and activates the dragging equipment sensor adjacent to the railroad, to alert railroad authorities to the overheated bearing before complete failure of the bearing. The connector chain or connector brackets, or both, typically has a bright, light-reflective color for enhanced visibility and identification of the overheated bearing. In another embodiment a rectangular offset bend connector plate is provided on each end of the connector chain in place of the connector brackets, to facilitate attachment of the connector chain to the pedestal adaptor. In still another embodiment, the connector brackets or offset bend connector plates are provided on opposite ends of an elongated, flexible connector cable instead of the connector chain.

BRIEF DESCRIPTION OF THE DRAWINGS

The invention will be better understood by reference to the accompanying drawings, wherein:

FIG. 3 is a side view of a heat-sensitive release bolt, typically used for suspending one of the connector brackets of the failed bearing indicator from the pedestal adaptor of the railcar;

FIG. 4 is a perspective view of a connector bracket component of the failed bearing indicators illustrated in FIGS. 1 and 2;

FIG. 5 is a longitudinal sectional view of the connector bracket illustrated in FIG. 4;

FIG. 6 is a front view of the connector bracket illustrated in FIGS. 4 and 5;

FIG. 9 is a front view of another embodiment of the failed bearing indicator, mounted on a pedestal adaptor of the railcar;

FIG. 10 is an exploded, perspective view of the failed bearing indicator illustrated in FIG. 9, illustrating a preferred, bolt technique for mounting the failed bearing indicator on the pedestal adaptor of the railcar; and FIG. 11 is a perspective view, partially in section, of still another embodiment of the failed bearing indicator.

DESCRIPTION OF THE PREFERRED EMBODIMENTS

Figure 1:
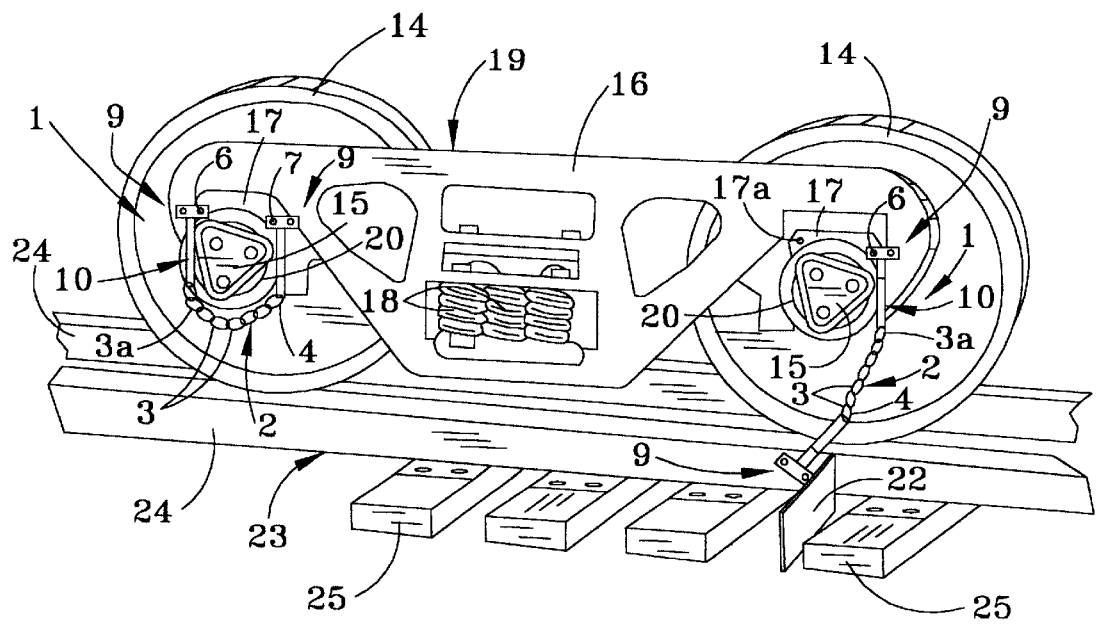
FIG. 1 is a perspective view of preferred embodiments of a pair of failed bearing indicators of this invention, mounted on respective drilled and tapped pedestal adaptors on a wheel unit of a railcar, with one of the failed bearing indicators shown suspended from the pedestal adaptor and striking a dragging equipment sensor on the side of a railroad in application of the failed bearing indicator.

Referring initially to FIG. 1 of the drawings, in a preferred embodiment the failed bearing indicator of this invention is generally illustrated by reference numeral 1. As hereinafter further described, a failed bearing indicator 1 is designed to be mounted typically on each of two pedestal adaptors 17 provided on each of the two wheel units 19 which are located on each side of each conventional cargo-or passenger-carrying railcar (not illustrated) of a train of multiple coupled railcars. Each of the four wheel units 19 of each railcar is characterized by an elongated truckside frame 16, mounted on the railcar and each end of which rests on the corresponding pedestal adaptor 17 which is mounted on an axle bearing 20. An axle journal 15 of a railcar axle (not illustrated) extends through the axle bearing 20. A railcar wheel 14 is mounted on each railcar axle, and the railcar wheel 14 rests on a railroad rail 24 of a railroad 23. Shock-absorbing truckside springs 18 are typically fitted in the truckside frame 16, between the railcar wheels 14 of each wheel unit 19, as illustrated. Multiple, conventional dragging equipment sensors 22 are typically located on the ballast (not illustrated) adjacent to and between the parallel railroad rails 24 of the railroad 23, at selected spacings with respect to each other along the railroad 23 for detecting and alerting railroad personnel to equipment, railcar components or cargo inadvertently falling or hanging from the railcar during transit of the railcar on the railroad 23. During prolonged travel of the railcar on the railroad 23, friction-induced heating of the rotating axle journal 15 in the stationary bearing 20 frequently causes overheating of the axle journal 15 in a defective bearing 20, and continued travel of the railcar on the railroad 23 can cause the axle journal 15 to break off from the axle and derailment of the railcar or railcars from the railroad 23.

Figure 2:
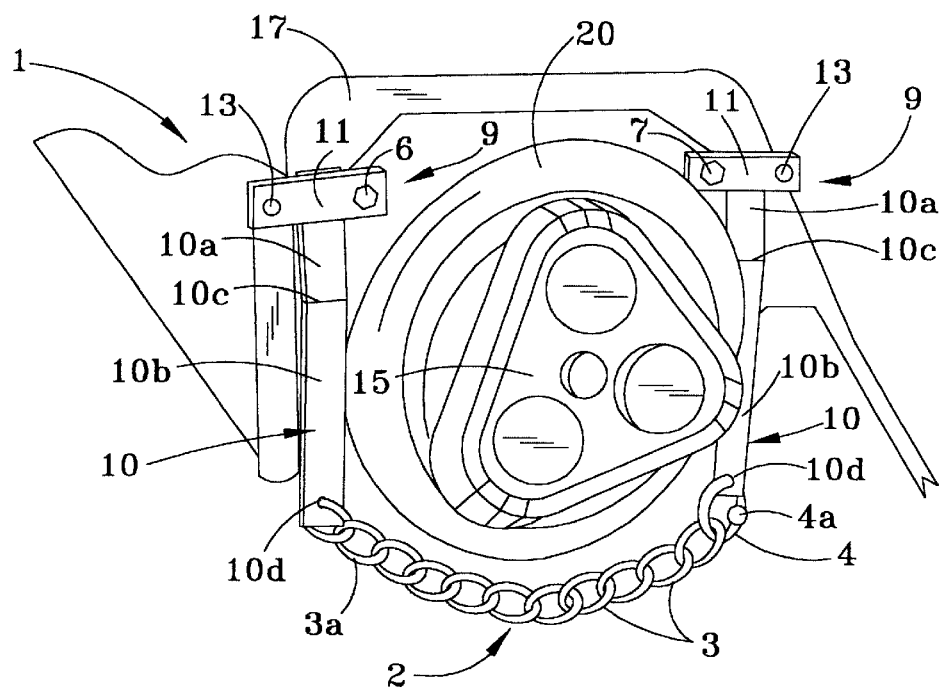
FIG. 2 is a perspective view of the failed bearing indicator, with both connector brackets of the failed bearing indicator mounted on a pedestal adaptor of the railcar.
Figure 7:
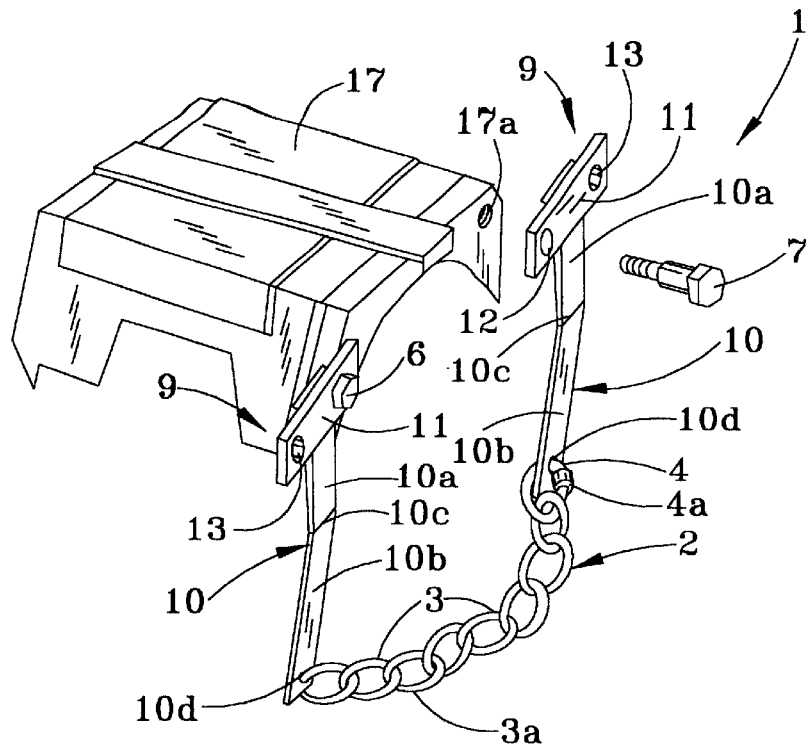
FIG. 7 is a perspective view of the failed bearing indicator illustrated in FIG. 2, more particularly illustrating a preferred, bolt technique for mounting the failed bearing indicator on a pedestal adaptor of the railcar.
Figure 8:
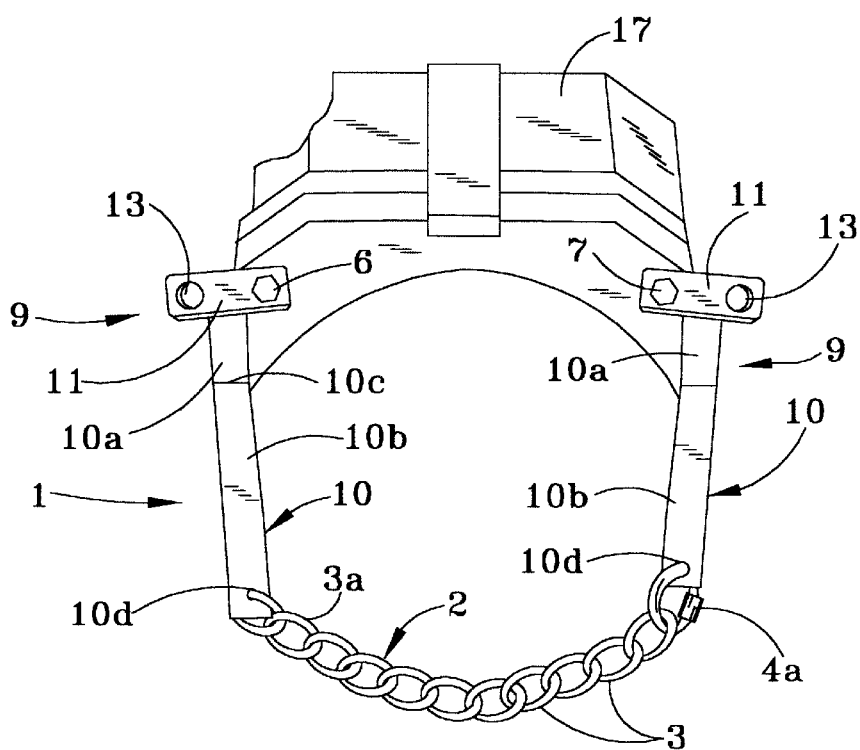
FIG. 8 is a front view of the failed bearing indicator, mounted on a pedestal adaptor of the railcar.

Referring again to FIG. 1 and to FIGS. 2–8 of the drawings, in a preferred embodiment of the invention each failed bearing indicator 1 is characterized by an elongated connector chain 2, having a selected number of interconnecting chain links 3 for a selected length of the connector chain 2. The chain links 3 of the connector chain 2 may be constructed of heat-resistant metal, including but not limited to, brass or stainless steel, in non-exclusive particular. A terminal link 3a terminates one end of the connector chain 2, and an attachment link 4, typically having a threaded collar 4a for selectively opening and closing the attachment link 4, terminates the opposite end of the connector chain 2 for purposes which will be hereinafter described. In a preferred embodiment the connector chain 2 has a bright, light-reflective color for purposes which will be hereinafter described. As illustrated in FIG. 2, a T-shaped connector bracket 9, also typically having a bright, light-reflective color, is provided on each end of the connector chain 2. Each connector bracket 9 is typically characterized by an elongated bracket arm 10, having a straight segment 10a and an angled segment 10b which extends from the straight segment 10a at an obtuse angle with respect to the straight segment 10a at an arm bend 10c, as illustrated in FIGS. 4 and 5. A connector opening 10d is provided in the angled segment 10b of each connector bracket 9, adjacent to the extending end thereof for receiving the corresponding terminal link 3a and attachment link 4 of the connector chain 2. A bracket plate 11 is typically welded or otherwise attached to the straight segment 10a, in substantially perpendicular relationship thereto and as illustrated in FIGS. 4 and 6, an inside bolt opening 12 and an outside bolt opening 13 extend through the bracket plate 11, adjacent to the respective ends thereof, for purposes which will be hereinafter described. The connector brackets 9 may be constructed of a heat-resistant metal, including but not limited to, brass or steel in non-exclusive particular. In typical application as hereinafter further described, the failed bearing indicator 1 is typically mounted on the corresponding drilled and tapped pedestal adaptor 17 of the wheel unit 19 of the railcar such that the angled segments 10b of the respective connector brackets 9 angle inwardly toward the pedestal adaptor 17, as illustrated in FIG. 7, in order to maintain the spanning connector chain 2 in spaced-apart relationship with respect to the axle journal 15, as illustrated in FIG. 2. Each failed bearing indicator 1 is mounted on the corresponding pedestal adaptor 17, with the connector bracket 9 which is attached to the attachment link 4 of the connector chain 2, typically positioned nearer the truckside springs 18, and the connector bracket 9 which is attached to the terminal link 3a of the connector chain 2 typically positioned farther from the truckside springs 18, as illustrated in FIG. 1. It is understood that the connector bracket 9 which is attached to the attachment link 4 may be positioned farther from the truckside springs 18 and the opposite connector bracket 9 positioned nearer the truckside springs 18, as desired. Accordingly, as further illustrated in FIG. 7, a heat-resistant attachment bolt 6, typically constructed of brass, steel or any other suitable heat-resistant metal and fitted with a lock washer (not illustrated), is typically extended through the inside bolt opening 12 of the connector bracket 9 which is connected to the terminal link 3a of the connector chain 2, and threaded into a registering drilled and tapped bolt opening 17a, provided in the pedestal adaptor 17. The length of the connector chain 2 is selected typically by suspending the opposite connector bracket 9 downwardly from the secured connector bracket 9, on the connector chain 2 and positioning the suspended connector bracket 9 about six inches beneath the top of the railroad rail 24 (FIG. 1), above the railroad crossties 25. The attachment link 4 is then removed from the adjacent link 3 in the connector chain 2 by operation of the threaded collar 4a, and is connected to the appropriate chain link 3 in the connector chain 2 such that the connector bracket 9 remains suspended about six inches beneath the railroad rail 24, above the crossties 25. The excess chain links 3a can be removed from the connector chain 2, as desired, such as by using a bolt cutter (not illustrated). The suspended connector bracket 9 is then raised and positioned against the pedestal adaptor 17, and a heat-sensitive release bolt 7, typically constructed of a low melting point plastic or bismuth, lead, tin or any suitable mixture of these metals or any other suitable low melting point metal, is typically extended through the inside bolt opening 12 of the connector bracket 9, and threaded into a corresponding drilled and tapped registering bolt opening 17a, provided in the pedestal adaptor 17. As illustrated in FIG. 3, the attachment bolt 6 and release bolt 7 typically each includes a bolt head 7a and a bolt shaft 7b, fitted with bolt threads 7c for threaded insertion in the corresponding bolt opening 17a of the pedestal adaptor 17, as illustrated in FIG. 7. The heat-sensitive release bolt 7 typically has a melting point of about 200 degrees Fahrenheit, whereas the attachment bolt 6 is constructed of steel, brass or any other suitable heat-resistant metal known to those skilled in the art. A bolt adhesive such as LOC-TITE (trademark) can be applied to the attachment bolt 6 and release bolt 7 prior to threaded insertion in the respective bolt openings 17a, as desired, to secure the attachment bolt 6 and release bolt 7 in the pedestal adaptor 17.

Referring again to FIGS. 1–8 of the drawings, in typical application of the failed bearing indicator 1 the connector brackets 9 of each failed bearing indicator 1 are attached to the corresponding pedestal adaptor 17 typically by means of the heat-resistant attachment bolt 6 and the heat-sensitive release bolt 7, with the angled segments 10b of the respective connector brackets 9 extending inwardly toward the axle bearing 20, as heretofore described with respect to FIG. 2. As the railcar (not illustrated) is pulled along the railroad 23, the axle journals 15 rotate in the respective stationary axle bearings 20 as the rotating railcar wheels 14 travel on the railroad rails 24. During prolonged travel of the railcar on the railroad 23, friction generated between the rotating axle journals 15 and the stationary axle bearings 20 frequently causes heating of one or more of the axle journals 15 in the respective axle bearings 20, and in some cases extreme overheating of the axle journal or journals 15 causes the axle journal or journals 15 to break away from the respective axle or axles (not illustrated), and derailing of the railcar or railcars occurs. Accordingly, heat from each overheating axle bearing 20 is conducted by the corresponding pedestal adaptor 17, and the temperature of the pedestal adaptor 17 continually rises, thus melting the heat-sensitive release bolt 7, whereas the heat-resistant attachment bolt 6 remains unaffected by the heat. Consequently, the melting release bolt 7 loses its structural integrity and releases the corresponding connector bracket 9 from the pedestal adaptor 17. The released connector bracket 9 swings downwardly and is suspended from the pedestal adaptor 17, by means of the heat-resistant attachment bolt 6 and corresponding connector bracket 9. As the railcar travels along the railroad 23, the suspended connector bracket 9 strikes one of the typically conventional dragging equipment sensors 22 adjacent to the railroad track 23, as illustrated in FIG. 1, and this activates the dragging equipment sensor 22 which alerts the train engineer and other railroad operating personnel that equipment, cargo, railcar components or a connector bracket 9 of one of the failed bearing indicators 1 is being dragged from the railcar. The engineer or personnel stop the train in order to examine the railcars coupled in the train, and this averts complete failure of the axle bearing or bearings 20, which caused the release and suspension of one or more of the connector brackets 9 from the corresponding pedestal adaptor 17. It will be appreciated by those skilled in the art that due to the bright, light-reflective color of the connector chain 2 and connector brackets 9 of the activated failed bearing indicator 1, the failed axle bearing or bearings 20 can be readily identified either in the daytime, or at night by using a flashlight or lantern.

Referring next to FIGS. 9 and 10 of the drawings, in another embodiment of the invention generally illustrated by reference numeral 8, the connector brackets 9 are replaced by generally rectangular offset bend connector plates 5 on the respective ends of the connector chain 2. The offset bend connector plates 5 may be constructed of any heat-resistant metal, including but not limited to, brass or steel, in non-exclusive particular. Accordingly, each offset bend connector plate 5 includes a connector opening 10d for receiving the terminal link 3a or attachment link 4 of the connector chain 2, and a bolt opening 5a (FIG. 10) for receiving the heat-resistant attachment bolt 6 or heat-sensitive release bolt 7. As heretofore described with respect to the embodiment illustrated in FIGS. 1–8, in application of the failed bearing indicator 8, overheating of the bearing 20 causes heating of the pedestal adaptor 17, and the release bolt 7 melts and releases the corresponding offset bend connector plate 5, which falls from the pedestal adaptor 17, and strikes and activates one of the dragging equipment sensors 22 alongside the railroad 23 to alert the train engineer or other railroad personnel to the overheated axle bearing or bearings 20.

Referring next to FIG. 11 of the drawings, in still another embodiment of the invention the connector brackets 9 (FIGS. 1–8) or offset bend connector plates 5 (FIGS. 9 and 10) are connected by an elongated, flexible connector cable 26, rather than the connector chain 2 described above with respect to FIGS. 1–10 of the drawings. Accordingly, the connector cable 26 is typically terminated by a pair of cable loops 26a, secured by respective cable stays 26b, which cable loops 26a either extend directly through the connector opening 10d of the corresponding connector bracket 9 or offset bend connector plate 5, or through a connector link 27 which engages the corresponding connector opening 10d, as illustrated. As described above with respect to the connector chain 2, the length of the connector cable 26 is selected such that the suspended connector bracket 9 or offset bend connector plate 5 is capable of reaching and striking the dragging equipment sensor 22 (FIG. 1) adjacent to the railroad 23, typically about six inches below the top of the railroad rail 24, above the railroad crossties 25.

It will be appreciated by those skilled in the art that the failed bearing indicator 1 (FIGS. 1–8) and the failed bearing indicator 8 (FIGS. 9 and 10) of this invention provides a simple, effective and inexpensive mechanism for alerting railroad personnel to an overheating railcar axle bearing in order to prevent complete failure of the bearing and derailment of the railcar or railcars from the railroad. It is understood that the heat-sensitive release bolt 7 can be constructed of any type of heat-sensitive plastic, metal or other material capable of melting at a friction-induced temperature of the axle bearing of the railcar which would indicate overheating of the axle journal in the axle bearing, typically about 200 degrees Fahrenheit. In a most preferred embodiment of the invention, a bright, light-reflective paint, tape or reflective glass beads in paint or epoxy or the like, is applied to both the connector brackets 9 or offset bend connector plates 5 and the connector chain 2 or connector cable 26, to render conspicuous the heat-activated and suspended failed bearing indicators and facilitate quick identification of the failing axle bearing or bearings on the railcar or railcars. It is further understood that any type of suitable heat-sensitive release mechanism instead of the heat-sensitive release bolt 7 can be used to release the corresponding connector bracket 9 from the pre-drilled and tapped pedestal adaptor 17 in the event of overheating of the axle bearing, according to the knowledge of those skilled in the art.

Referring again to FIG. 2 of the drawings, it is understood that the connector bracket 9 which is attached to the drilled and tapped pedestal adaptor 17 by means of the heat-resistant attachment bolt 6 can be fastened to the connector chain 2 by means of either the terminal link 3a or attachment link 4, and the opposite connector bracket 9 can be fastened to the connector chain 2 in like manner by means of either the terminal link 3a or attachment link 4, as desired. In a preferred embodiment one or both of the connector brackets 9 are attached to the connector chain 2 by means of an attachment link 4, in order to facilitate achieving a proper length of the connector chain 2, as heretofore described. It is understood that the connector brackets 9 and connector chain 2 can be constructed in various sizes and lengths, including a standard length or lengths of the connector chain 2, in which case the connector brackets 9 may be permanently attached to the respective ends of the connector chain 2, typically by means of respective terminal links 3a. The connector brackets 9 and attachment link or links 4 and terminal link or links 3a can be case-hardened, as desired, according to the knowledge of those skilled in the art in order to minimize wear of these components during use.

Referring again to FIGS. 4 and 6 of the drawings, the identical inside bolt opening 12 and outside bolt opening 13 are provided in the bracket plate 11 of the connector brackets 9 to facilitate interchangeable attachment of the connector brackets 9 to either side of the pre-drilled and tapped pedestal adaptor 17. Referring again to FIG. 1 of the drawings, it is understood that while the connector brackets 9 or offset bend connector plates 5 of the failed bearing indicator 1 can be mounted on the truckside frame 16 of the wheel unit 19, the connector brackets 9 or offset bend connector plates 5 are preferably mounted on the pedestal adaptor 17, since this location provides a more precise indication of the temperature of the axle bearing 20 to the heat-sensitive release bolt 7.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A failed bearing indicator for indicating an overheated axle on a railcar by activating a dragging equipment indicator adjacent to a railroad, said failed bearing indicator comprising an elongated, flexible connector having a first end for attachment to the railcar and a second end spaced from said first end; a substantially heat-resistant first fastener engaging said first end of said connector for fastening said first end of said connector to the railcar; and a substantially heat-sensitive second fastener engaging said second end of said connector for fastening said second end of said connector to the railcar, whereby said second fastener releases said second end of said connector from the railcar as said first end of said connector remains fastened to said first fastener, and said second end of said connector swings downwardly from said second fastener and strikes and activates the dragging equipment indicator, responsive to overheating of the axle.

2. The failed bearing indicator of claim 1 wherein said connector comprises an elongated connector chain of selected length.

3. The failed bearing indicator of claim 1 wherein said first fastener comprises a bolt.

4. The failed bearing indicator of claim 3 wherein said connector comprises an elongated connector chain of selected length.

5. The failed bearing indicator of claim 1 wherein said second fastener comprises a bolt.

6. The failed bearing indicator of claim 5 wherein said connector comprises an elongated connector chain of selected length.

7. The failed bearing indicator of claim 5 wherein said first fastener comprises a bolt.

8. The failed bearing indicator of claim 7 wherein said connector comprises an elongated connector chain of selected length.

9. The failed bearing indicator of claim 1 comprising a connector plate provided on said second end of said connector for contacting the dragging equipment indicator, and wherein said second fastener engages said connector plate.

10. The failed bearing indicator of claim 9 wherein said connector comprises an elongated connector chain of selected length.

11. The failed bearing indicator of claim 9 wherein said first fastener comprises a bolt.

12. The failed bearing indicator of claim 11 wherein said connector comprises an elongated connector chain of selected length.

13. The failed bearing indicator of claim 9 wherein said second fastener comprises a bolt.

14. The failed bearing indicator of claim 13 wherein said connector comprises an elongated connector chain of selected length.

15. The failed bearing indicator of claim 13 wherein said first fastener comprises a bolt.

16. The failed bearing indicator of claim 15 wherein said connector comprises an elongated connector chain of selected length.

17. A failed bearing indicator or mounting on a pedestal adaptor of a railcar and indicating an overheated axle on the railcar by striking and activating a dragging equipment indicator adjacent to a railroad, said failed bearing indicator comprising an elongated, flexible connector chain having a first end and a second end spaced from said first end; a first, substantially T-shaped connector bracket carried by said first end of said connector chain and a first fastener engaging said first connector bracket for fastening said first connector bracket to the pedestal adaptor; and a second, substantially T-shaped connector bracket carried by said second end of said connector chain and a second fastener engaging said second connector bracket for attaching said second connector bracket to the pedestal adaptor, said first fastener constructed of a substantially heat-resistant material and said second fastener constructed of a substantially heat-sensitive material, whereby said second fastener melts and releases said second connector bracket from the pedestal adaptor and said second connector bracket swings downwardly from said second fastener and strikes and activates the dragging equipment indicator as said first connector bracket remains fastened to said first fastener, responsive to overheating of the axle.

18. The failed bearing indicator of claim 17 wherein said first fastener comprises a bolt for threadibly engaging said pedestal adaptor.

19. The failed bearing indicator of claim 18 wherein said second fastener comprises a second bolt for threadibly engaging said pedestal adaptor.

20. A failed bearing indicator for mounting on a pedestal adaptor of a railcar and indicating an overheated axle on the railcar by dropping from a secured to a suspended configuration from the railcar and striking and activating a dragging equipment indicator adjacent to a railroad, said failed bearing indicator comprising an elongated, flexible connector chain having a first end and a second end spaced from said first end; a first connector bracket carried by said first end of said connector chain and a second connector bracket carried by said second end of said connector chain, said first connector bracket and said second connector bracket each comprising a bracket arm having a straight segment, an angled segment extending from one end of said straight segment in angled relationship to said straight segment for engaging said connector chain and a bracket plate provided on the other end of said straight segment of said bracket arm; a substantially heat-resistant attachment bolt engaging said bracket plate of said first connector bracket for fastening said first connector bracket to the pedestal adaptor; and a substantially heat-sensitive release bolt engaging said bracket plate of said second connector bracket for attaching said second connector bracket to the pedestal adaptor, whereby said release bolt melts and releases said second connector bracket from the pedestal adaptor and said second connector bracket strikes and actives the dragging equipment indicator as said first connector bracket remains fastened to said attachment bolt, responsive to overheating of the axle.

* * * * *